Feb. 13, 1968 H. W. SCHOLIN ETAL 3,368,414
INTERMITTENT MOTION APPARATUS
Filed July 7, 1965
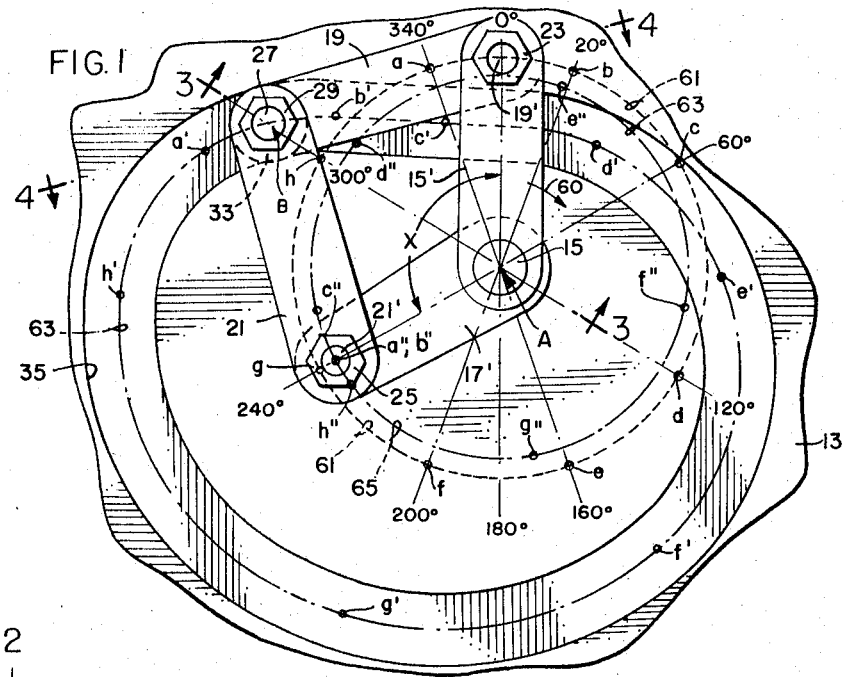
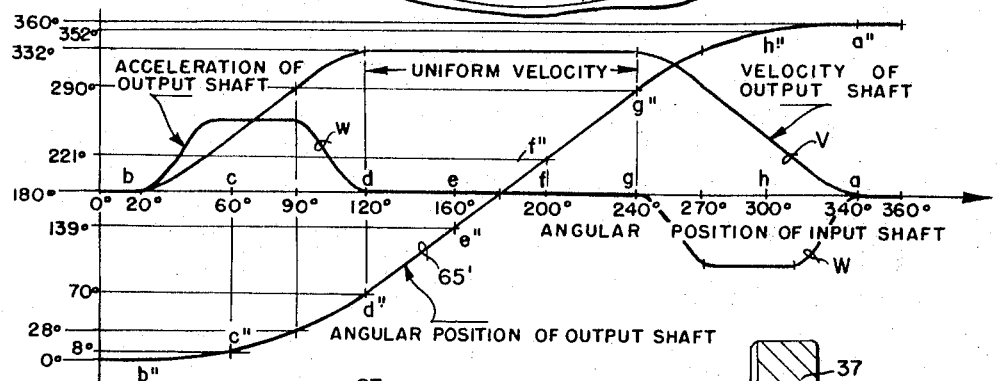
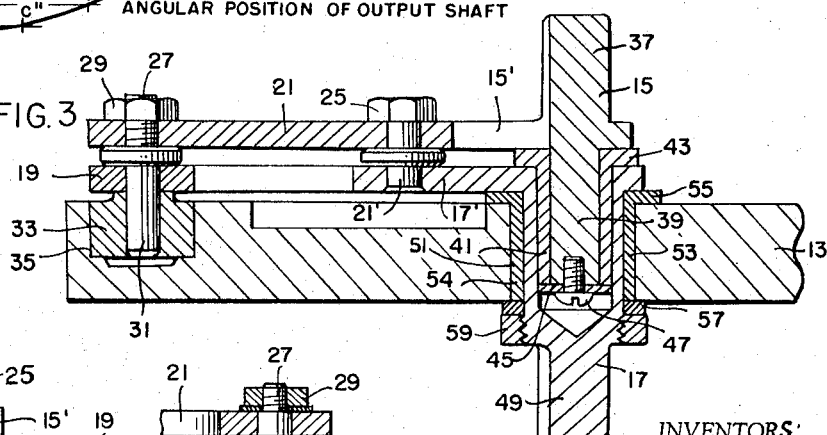
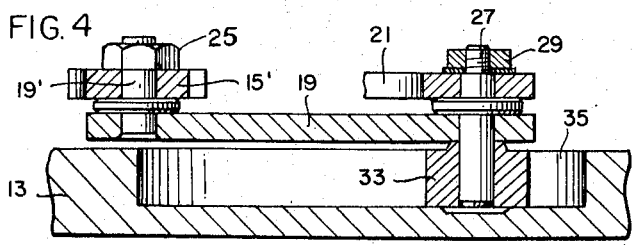
INVENTORS:
HAROLD W. SCHOLIN
HOLGER E. PEDERSEN
ATT'YS

United States Patent Office 3,368,414
Patented Feb. 13, 1968

3,368,414
INTERMITTENT MOTION APPARATUS
Harold W. Scholin, 1225 N. Northwest Highway, Park Ridge, Ill. 60068, and Holger E. Pedersen, Chicago, Ill.; said Pedersen assignor to said Scholin
Filed July 7, 1965, Ser. No. 470,167
3 Claims. (Cl. 74—68)

ABSTRACT OF THE DISCLOSURE

Rotatable input and output shafts are each connected with a common cam follower, by means of a crank and a connecting link, while the cam follower rides in an endless non-circular groove, which extends around and at varying distances from the axes of said shafts, the groove having an arcuate segment curved on a radius equal to the length of the output shaft connected link, so that the output shaft may be turned at varying speed, in response to rotation of the input shaft at uniform speed, and may remain stationary, while the cam follower traverses the arcuate segment of the groove.

---

The present invention relates in general to variable speed driving mechanism adapted for connection between a rotary prime mover, such as an electric motor, and a mechanical load driven by the motor, the mechanism being adapted to drive the load at varying rates of speed, including zero or standstill as well as constant speed, at intervals during each complete rotation of the load, in response to constant speed rotation of the prime mover, the invention having more particular reference to a novel intermittent motion mechanism especially well adapted for turning rotary index tables and the like between successive stationary indexed positions.

An important object of the present invention is to provide a mechanical drive mechanism adapted for driving connection with a constant speed prime mover, such as an electric motor, to drive a load device intermittently at speeds varying between maximum and minimum speeds, including zero or stationary as well as constant speed, if desired, during each rotary cycle of the mechanism.

Briefly stated, the invention as applied in a preferred embodiment contemplates a mechanism comprising an input shaft adapted to be rotatably driven as at constant speed, by a suitable prime mover, such as an electric hydraulic pneumatic or other motor, the input shaft having a radial arm connected, as by means of a link, to drive a cam follower, such as a roller, along an endless cam track of selected configuration disposed about the axis of the input shaft and extending at various distances radially of the axis thereof, the cam follower being connected, as by means of a link, with a radially extending arm formed on an output shaft adapted for connection with any load device, such as a rotary index table, requiring to be driven intermittently between stationary indexed positions, said output shaft being mounted for turning movement on an axis coincident with the axis of the input shaft.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

FIG. 1 is a top plan view of driving mechanism embodying the present invention;

FIG. 2 is a graphical representation of movements of the mechanism shown in FIG. 1; and FIGS. 3 and 4 are enlarged sectional views taken respectively along the lines 3—3 and 4—4 in FIG. 1.

To illustrate the invention, the drawings show intermittent motion mechanism 11 comprising a preferably flat plate 13 of rigid self-supporting material, such as steel, which forms the main frame of the mechanism. Suitable means such as bolts, pedestals and the like may be provided for mounting the plate 13 firmly in position for use, as for instance on the frame of a rotary index table to be driven by the apparatus of the invention. The mechanism 11 comprises a pair of coaxially aligned stems or stub shafts 15 and 17 suitably journaled for relative turning movement on the support frame 13 about the common axis A, said stems having radially extending arms 15', 17' rigidly secured thereto. The stem remote ends of the arms 15', 17' may be pivotally connected respectively with links 19 and 21, as by means of pivot pins or studs 19', 21', and associated lock nuts 23, 25. The arm remote ends of the links 19 and 21 also may be pivotally interconnected as by means of a pin or stud 27 and an associated lock nut 29, the stud having a projecting end 31 carying a roller 33 freely turnable thereon, about an axis B, the roller being carried in position to ride in an endless guiding groove or cam track 35 formed in the plate 13 around and spaced at varying distances radially of the aligned axes A of the stub shafts 15 and 17.

As shown, the shaft 15 has a stub portion 37 and a bearing portion 39 respectively extending upwardly and downwardly on opposite sides of the arm 15', the downwardly extending bearing portion being turnably received in a sleeve bushing 41 having a flange 43 at one end in engagement with the underside of the arm 15'. A retaining washer 45 secured to the lower end of the bearing portion 39, as by means of a fastening screw 47, may be provided to hold the bushing 41 on the bearing portion of the stub shaft 15 between the arm 15' and the retaining washer 45, the marginal edges of which project outwardly of the bearing portion 39 in position to engage the end of the bushing 41, remote from the arm 15'. The shaft 17 has a stub portion 49 and a hollow cylindrical bearing portion 51, said hollow portion carrying the arm 17' at the end thereof remote from the stub portion 49. The hollow portion extends through a bushing 53 press-fit'ed in an opening 54 formed through the plate 13, within the cam track 35. One end of the bushing 53 may be provided with a flange 55 adapted to overlie the upper face of the plate 13 around the opening 54, beneath the arm 17'. The shaft 17 and attached arm 17' may be mounted on the plate 13 by inserting the stub portion 49, followed by the hollow portion 51, into and through the sleeve bushing 53 into position with the lower side of the arm 17' in engagement with the upper flanged end 55 of the bushing 53, which serves as a thrust bearing for the member 17. In such position, the hollow portion 51 of the stub shaft 17 extends within the bushing 53 and the stub portion 49 projects outwardly of the underside of the plate 13. A thrust bearing washer 57 and a lock nut 59 threadedly engaged with the lower end of the hollow portion 51 may be provided to secure the shaft 17 in place on the plate 13. After the shaft 17 and bushing 53 have thus been assembled in the opening 54, the member 15, with bushing 41 assembled thereon may be mounted within the hollow portion 51 of the member 17, after which the links 19 and 21 may be pivotally interconnected and pivotally connected with the arms 15' and 17' in order to complete the assembly.

The mechanism may be operated by connecting a suitable or preferred driving motor with the projecting portion 37 of the stub shaft 15 to cause it to rotate in the clockwise direction indicated by the arrow 60, in FIG. 1 of the drawings, thus also turning the arm 15' clockwise about the axis of the stub shaft 15. Such movement of the arm 15' will draw the leading end of the link 19 around the axis of the stub shaft 15 in a circular path 61 defined by the movement of the axis of the stud 19'. The trailing end of the link 19, of course, will be guided by the roller 33 in the path defined by the roller guiding groove 35. The forward end of the link 21 likewise will follow the path defined by the roller guiding groove 35, while its trailing end will draw the arm 17' in a clockwise direction around the axis of the stub shaft 15 at varying rates of speed depending upon the configuration of the roller guiding groove 35.

Assuming that the prime mover drives the shaft 15 and attached arm 15' at constant angular speed about the axes A, the forward end of the link 19 will likewise move at constant speed along the circular path 61 of the axis of stud 19'. Since the roller guiding groove 35 does not define a circular path around the axes A, the trailing end of the link 19 will move at varying rates of speed along the track 35 and the distance AB between the aligned axes A of the stub shafts 15 and 17 and the axis B of the roller carrying stud 27 will vary from moment to moment as the roller 33 travels around the track 35; and the relative angularity X of the arms 15' and 17' will vary continuously as the roller travels along the track. In this connection, it may be noted that where the configuration of the track is such as to cause the distance AB to increase, the speed of the roller along the track as well as the speed of angular rotation of the arm 17' and connected shaft 17, about the axes A will likewise increase. Contrarywise, when the dimension AB is caused to decrease, the movement of the roller along the track will become slower, and the angular speed of the shaft 17 and arm 17' about the axes A will decrease. As and when the dimension AB remains constant, the roller likewise will move at constant speed along the groove 35, and the arms 15' and 17' will turn in unison.

The dimension AB will remain constant when the roller 33 travels a portion of the groove having a constant radius about the axes A. The dimension AB will increase and decrease when the roller 33 traverses portions of the groove which respectively diverge away from and approach toward the axes A.

Relating these variable speed characteristics to the mechanism, it will be seen that the cam track 35 may be configurated to accelerate, decelerate and stop as well as to maintain constant the rotary speed of movement of the driven shaft 17 at desired intervals, during a complete cycle of the mechanism, while the shaft 15 is driven at uniform speed. As a consequence any device, such as a rotary index table drivingly connected with the stub shaft 17 may be driven at correspondingly varying rates of speed, and may be stopped, at intervals, the same being a highly desirable feature in the design of intermittent motion apparatus. It is frequently desirable to design the apparatus so that the variable speed shaft 17 will become and remain stationary, while the input shaft 15 continues to move, and to provide for acceleration, from stationary condition, at a desired rate, until a preferred speed is reached and maintained at a constant value during a desired interval followed by deceleration to the stationary condition. This can readily be provided in mechanism embodying the present invention, as indicated in FIG. 2, which provides a somewhat idealized and diagrammatic indication of speed acceleration and relative angular position of the output shaft 17 with respect to the angular position of the input shaft 15, during one complete rotation of the mechanism in a clockwise direction, viewing FIG. 1.

As the driven shaft 15 and arm 15' are turned at uniform angular velocity about the axis A, the axis of the stud 19' will move at constant speed along the circular path 61 from a starting station arbitrarily marked 0° in FIGS. 1 and 2, through angularly displaced stations b, c, d, e, f, g, h, and a, respectively displaced 20°, 60°, 120°, 160°, 200°, 240°, 300°, and 340°, from the 0° or 360° station; and the axis B of the roller 33 will travel a path 63 along the center of the groove 35, and will momentarily occupy stations b', c', d', e', f', g', h', and a' at the instants when the axis of the stud 19' respectively occupies the stations b, c, d, e, f, g, h, and a along the circular path 61. As the roller 33 travels along the groove 35, the arm 17' and the driven shaft 17 will be turned about the axis A, in a clockwise direction viewing FIG. 1, so that the axis of the connecting stud 21 will travel a circular path 65 and will momentarily occupy successive stations or positons b'', c'', d'', e'', f'', g'', h'', and a'' at the instants when the axis B occupies the corresponding stations b', c'. d'. e', f', g', h', and a' in the groove 35.

By plotting the displacement of the output arm 17', as defined by the axis of the stud 21', from the 0° or starting position, shown in FIG. 1, against the displacement of the input arm 15', the relative position of the output arm and shaft may be illustrated as by the graphical curve 65' in FIG. 2, and the corresponding angular velocities and acceleration of the output arm and shaft during a rotary cycle of the apparatus may likewise be illustrated by graphical curves V and W. The curve V indicates that the output arm and shaft may travel at uniform velocity during each rotation of the apparatus, such period of uniform velocity, in the illustrated embodiment, occurring during an interval when the apparatus is halfway through its rotary cycle, and also that the output arm and shaft are stationary while the input shaft and arm move between the 340° station, a, and the 20° station, b, through the 0° position.

The graphs of FIG. 2 show that, at the conclusion of the standstill interval, the output shaft and arm may be set in motion at progressively increasing speeds until maximum velocity is reached, approximately when the input shaft reaches the 120° station, d, after which the output shaft and arm move at substantially uniform velocity until the input arm and shaft reach the 240° station, g, after which velocity decreases until the output shaft becomes stationary, substantially at the 340° station, a.

The groove 35, of course, may be configurated to increase or decrease the velocity of the output arm and shaft at uniform or variable rates, to provide uniform or non-uniform acceleration and deceleration, as desired or needed. It should be noted that the complete cycle of the mechanism from standstill through acceleration, constant velocity, and deceleration takes place during one complete rotation of the mechanism. If desired, the mechanism may be arranged to make two or more complete variable speed cycles per revolution of the input shaft 15. It should also be noted that the constant velocity interval may be omitted entirely, and that the cam track may be so shaped that the movement of the driven shaft proceeds directly from acceleration to deceleration.

It will be obvious that the mechanism may be used by driving the input shaft in the counterclockwise direction, viewing FIG. 1, in which case the roller 33 will be pushed along the track groove 35 by the action of the input shaft and arm, and will in turn push the output arm and shaft around the axis A. It will also be obvious that, by appropriately shaping the cam groove 35 to allow the roller to move along the groove, the mechanism may be used by driving the stub shaft 17 in either clockwise or counterclockwise direction, while the stub shaft 15 is connected with a load to be driven. When thus driven through the stub shaft 17, the action of the mechanism will not merely reverse or inert the action realized when the same is driven through the stub shaft 15; but in order to obtain a desired cyclical operation the cam groove 35 will have to be reshaped.

Among the many advantages and benefits afforded by the mechanism of the present invention is its simplicity, ruggedness and compactness. The mechanism also offers custom design possibilities, since the shape of the cam track can be varied to meet the load needs of driven apparatus to which it may be desired to connect the output shaft. Another advantage resides in the arrangement wherein the input and output shafts are concentric. The cam track may be shaped to give either uniform or non-uniform acceleration and deceleration of the driven arm and shaft. The various parts may, of course, be sized to meet large or small load requirements. The mechanism is relatively simple and exceedingly inexpensive to manufacture, and is unique in that the cam groove is mounted in a stationary plate and hence does not rotate.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of demonstrating the invention.

The invention is hereby claimed as follows:

1. Apparatus of the character described comprising a support frame, a pair of shafts mounted on the frame for turning movement about a common axis, one shaft having a hollow portion concentrically enclosing and turnably supporting a portion of the other shaft, an arm connected with and extending outwardly of each shaft, means forming an endless track on said frame around and spaced outwardly of said axis, a track follower mounted for movement along the track, and a link connecting the track follower with each of said arms remote from said axis.

2. Apparatus of the character described comprising a support frame, a pair of shafts mounted on the frame for turning movement about a common axis, an arm connected with and extending outwardly of each shaft, means forming an endless track on said frame around and spaced outwardly of said axis, a track follower mounted for movement along the track, a link connecting the track follower with each of said arms remote from said axis, means to connect one of said shafts to the turntable component of an indexing table, and means to connect the other shaft to a prime mover, said track having a portion forming a circular arc having radius equal to the length of one of said links, whereby the arm connected with said link may remain stationary while the track follower traverses said track portion.

3. Apparatus of the character described comprising a support frame, a pair of shafts mounted on the frame for turning movement about a common axis, an arm connected with and extending outwardly of each shaft, means forming an endless track on said frame around and spaced outwardly of said axis, a track follower mounted for movement along the track, a link connecting the track follower with each of said arms remote from said axis, means to connect one of said shafts to the turnable component of an indexing table, and means to connect the other shaft to a prime mover, said track having a portion forming a circular arc having radius equal to the length of one of said links, whereby the arm connected with said link may remain stationary while the track follower traverses said track portion, and means to disable or disconnect the prime mover while said arm is stationary.

References Cited

UNITED STATES PATENTS 2,959,061   11/1960   Bauer _____ 74—84

FOREIGN PATENTS 906,877   3/1954   Germany.

FRED C. MATTERN, JR., *Primary Examiner.*

W. S. RATLIFF, *Assistant Examiner.*